US009183050B2

(12) United States Patent
Vijayarangan et al.

(10) Patent No.: US 9,183,050 B2
(45) Date of Patent: Nov. 10, 2015

(54) SYSTEM AND METHOD FOR DETERMINING TOTAL PROCESSING TIME FOR EXECUTING A PLURALITY OF JOBS

(71) Applicant: Tata Consultancy Services Limited, Mumbai, Maharashtra (IN)

(72) Inventors: Natarajan Vijayarangan, Tamil Nadu (IN); Muralidharan Somasundaram, Tamil Nadu (IN); Kishore Padmanabhan, Tamil Nadu (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 14/505,875

(22) Filed: Oct. 3, 2014

(65) Prior Publication Data

US 2015/0248313 A1    Sep. 3, 2015

(30) Foreign Application Priority Data

Feb. 28, 2014  (IN) .......................... 711/MUM/2014

(51) Int. Cl.
*G06F 9/46* (2006.01)
*G06F 9/48* (2006.01)
*G06F 9/50* (2006.01)

(52) U.S. Cl.
CPC ............ *G06F 9/4887* (2013.01); *G06F 9/5011* (2013.01)

(58) Field of Classification Search
CPC ............................ G06F 9/4887; G06F 9/5011
USPC .................................................. 718/102–104
See application file for complete search history.

(56) References Cited

U.S. PATENT DOCUMENTS

| 5,923,873 | A | 7/1999 | Massey et al. |
|---|---|---|---|
| 7,734,676 | B2 | 6/2010 | Dritschler et al. |
| 8,650,298 | B2 | 2/2014 | Daly et al. |
| 2008/0289017 | A1* | 11/2008 | Fellenstein et al. ............... 726/8 |
| 2014/0032257 | A1* | 1/2014 | Houle .......................... 705/7.25 |
| 2014/0208327 | A1* | 7/2014 | Cadambi et al. .............. 718/103 |

OTHER PUBLICATIONS

Lik Gan Alex Sung, "Autonomic Resource Management for a Cluster that Executes Batch Jobs", Waterloo, Ontario, Canada, 2006 (Theseis).
Utilization difference between a multiple server, single queue and a multiple server, multiple queue system, Jun. 19, 2013.
Xiaofeng Zhao, "Approximation methods for the standard deviation of flow times in the g/g/s queue", Aug. 2007 (Dissertation).
Bhattacharja, Bonane, "A better numerical approach for finding the steady-state waiting time and the average queue length of a system for the arithmetic GI/G/1 queue", Nov. 2011 (Thesis).
Vidhyacharan Bhaskar, & G. Lavanya, "Equivalent single-queue-single-server model for a Pentium processor", Applied Mathematical Modelling, vol. 34, p. 2531-2545 (2010); online pub. Nov. 20, 2009.

* cited by examiner

*Primary Examiner* — Anna Deng
(74) *Attorney, Agent, or Firm* — Shumaker, Loop & Kendrick, LLP

(57) ABSTRACT

Method and system for determining the total processing time required for executing a plurality of jobs (n). The plurality of jobs along with a mean processing time (μ), and a queue length (k) are received. A number of preliminary jobs (p) of the plurality of jobs (n) are distributed across computing resources based upon the queue length (k). A first processing time ($T_F$) required for the execution of the number of preliminary jobs (p) is determined. Further, a number of remaining jobs (n−p) of the plurality of jobs (n) are distributed for execution across the plurality of computing resources. A second processing time ($T_S$) required for the execution of the set of remaining jobs (n−p) is computed. Finally, the total processing time is determined by summing $T_F$ and $T_S$.

10 Claims, 3 Drawing Sheets

SYSTEM AND METHOD FOR DETERMINING TOTAL PROCESSING TIME FOR EXECUTING A PLURALITY OF JOBS

CROSS-REFERENCE TO RELATED APPLICATIONS AND PRIORITY

The present application claims priority from Indian Patent Application No. 711/MUM/2014 filed on Feb. 28, 2014.

TECHNICAL FIELD

The present disclosure relates in general to systems and methods for determining total processing time required for executing multiple jobs received in real time.

BACKGROUND

In a computing network environment, multiple computing resources are deployed at different geographical locations in order to execute jobs associated with software applications of different technologies. The execution of the jobs is managed through a service level agreement (SLA) between a service provider and a customer. The service provider facilitates the execution of the jobs belonging to the customer. The customer may prescribe its requirements regarding the execution of the jobs through the SLA. In one example, the customer may set a pre-defined time limit (also referred to as total processing time hereinafter) for the execution of the jobs. Based on the requirements of the customer, the service provider may have to accordingly plan and execute the jobs, so that the SLA is complied.

In order to comply with the SLA, the service provider may have to effectively analyze supply and demand of the computing resources, such that the jobs are executed within the pre-defined time limit set as per the SLA. Further, in a typical scenario, while there are first few set of jobs that are being processed for execution by the computing resources, the remaining set of jobs are waiting in a queue for the execution by the computing resources. In certain conditions, processing time required for execution of the first few set of jobs may vary from a predefined threshold time period as per the SLA. Since, there is variance in the execution of the first few set of jobs, it becomes a technical challenge to effectively plan and allocate the computing resources for the execution of the remaining set of jobs, such that the overall jobs including the first few set of jobs and the remaining set of jobs are executed in the total processing time as per the SLA.

SUMMARY

Without limiting scope, disclosed are exemplary systems and methods for determining a total processing time for executing a plurality of jobs and the aspects are further described below in the detailed description.

In one implementation, a system for determining a total processing time (T) for executing a plurality of jobs (n) is disclosed. The system may include a processor and a memory coupled to the processor for executing a plurality of modules stored in the memory. The plurality of modules may include a receiving module, a distributing module, and a determining module. The receiving module may be configured to receive the plurality of jobs (n), a mean processing time ($\mu$), and a queue length (k). In one aspect, the mean processing time ($\mu$) may be indicative of average time required for executing a job of the plurality of jobs (n). Further, the queue length (k) may be indicative of a maximum number of jobs capable of being executed by a single computing resource in a predefined time period. The distributing module may be configured to distribute preliminary jobs (p) of the plurality of jobs (n) for execution across a plurality of computing resources based upon the queue length (k). Further, the distributing module may be configured to determine a first processing time ($T_F$) required for the execution of the preliminary jobs (p). In one embodiment, the first processing time ($T_F$) is determined using a residual time function [H(t)] of the queue length (k). In one aspect, $H(t)=1/\mu \int_0^t (1-F(t))dt$. Further, F(t) may be indicative of a cumulative distribution function of a set of random variables ($x_1, x_2 \ldots x_p$). The distributing module may be configured to distribute remaining jobs (n–p) of the plurality of jobs (n) for execution across the plurality of computing resources based upon the queue length (k). The determining module may be configured to determine a second processing time ($T_S$) required for the executing of the remaining jobs (n–p) based upon the first processing time ($T_F$) and the queue length (k). Further, the determining module may be configured to sum the first processing time ($T_F$) and the second processing time ($T_S$) in order to determine the total processing time (T).

In another implementation, a method for determining a total processing time (T) for executing a plurality of jobs (n) is disclosed. The method may include receiving the plurality of jobs (n), a mean processing time ($\mu$) and a queue length (k). In one aspect, the mean processing time ($\mu$) may be indicative of average time required for executing a job of the plurality of jobs (n). Further, the queue length (k) may be indicative of a maximum number of jobs capable of being executed by a single computing resource in a predefined time period. The method may further include distributing preliminary jobs (p) of the plurality of jobs (n) for execution across a plurality of computing resources based upon the queue length (k). Further, the method may include determining a first processing time ($T_F$) required for the execution of the preliminary jobs (p). In one embodiment, the first processing time ($T_F$) is determined using a residual time function [H(t)] of the queue length (k). In one aspect, $H(t)=1/\mu \int_0^t (1-F(t))dt$. Further, F(t) may be indicative of a cumulative distribution function of a set of random variables ($x_1, x_2 \ldots x_p$). The method may further include distributing remaining jobs (n–p) of the plurality of jobs (n) for execution across the plurality of computing resources based upon the queue length (k). The method may further include determining a second processing time ($T_S$) required for the executing of the remaining jobs (n–p) based upon the first processing time ($T_F$) and the queue length (k). Further, the method may include summing the first processing time ($T_F$) and the second processing time ($T_S$) in order to determine the total processing time (T). In an aspect, at least one of the receiving, the distributing the preliminary jobs (p), the determining, the distributing the remaining jobs (n–p), the computing, and the summing are performed by a processor using a set of instructions stored in a memory.

In yet another implementation, a computer program product having embodied thereon a computer program for determining a total processing time (T) for executing a plurality of jobs (n) is disclosed. The computer program product may include an instruction for receiving the plurality of jobs (n), a mean processing time ($\mu$), and a queue length (k). In one aspect, the mean processing time ($\mu$) may be indicative of average time required for executing a job of the plurality of jobs (n). Further, the queue length (k) may be indicative of a maximum number of jobs capable of being executed by a single computing resource in a predefined time period. The computer program product may further include an instruction for distributing preliminary jobs (p) of the plurality of jobs (n) for execution across a plurality of computing resources based upon the queue length (k). Further, the computer program product may include an instruction for determining a first processing time ($T_F$) required for the execution of the preliminary jobs (p). In one embodiment, the first processing time ($T_F$) is determined using a residual time function [H(t)] of the queue length (k). In one aspect, $H(t)=1/\mu \int_0^t (1-F(t))dt$. Further, F(t) may be indicative of a cumulative distribution function of a set of random variables ($x_1, x_2 \ldots x_p$). The computer program product may further include an instruction for distributing remaining jobs (n−p) of the plurality of jobs (n) for execution across the plurality of computing resources based upon the queue length (k). The computer program product may further include an instruction for determining a second processing time ($T_S$) required for the executing of the remaining jobs (n−p) based upon the first processing time ($T_F$) and the queue length (k). Further, the computer program product may include an instruction for summing the first processing time ($T_F$) and the second processing time ($T_S$) in order to determine the total processing time (T).

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings. Disclosed are systems and methods for determining a total processing time (T) for executing a plurality of jobs (n) are described. The systems and methods enable effective and efficient technique of determining the determining a total processing time (T) for executing the plurality of jobs (n). In order to determine the total processing time (T), at first, the system may receive the number of jobs (n) along with a mean processing time (μ), and a queue length (k). After the receipt of the number of jobs (n), the system may distribute preliminary jobs (p) of the number of jobs (z) for execution across a plurality of computing resources based upon the queue length (k). After the distribution of the preliminary jobs (p), the system may determine a first processing time ($T_F$) required for the execution of the preliminary jobs (p) by the plurality of computing resources. Thereafter, the system may distribute remaining jobs (n−p) of the number of jobs (n) for execution across the plurality of computing resources. The system may then compute a second processing time ($T_S$) required for the executing of the remaining jobs (n−p) based upon the first processing time ($T_F$) and the queue length (k). Finally, the total processing time (T) may be determined by summing the first processing time ($T_F$) and the second processing time ($T_S$). While aspects of described system and method for determining a total processing time (T) for executing a plurality of jobs (n) may be implemented in any number of different computing systems, environments, and/or configurations, the embodiments are described in the context of the following exemplary system.

Figure 1:
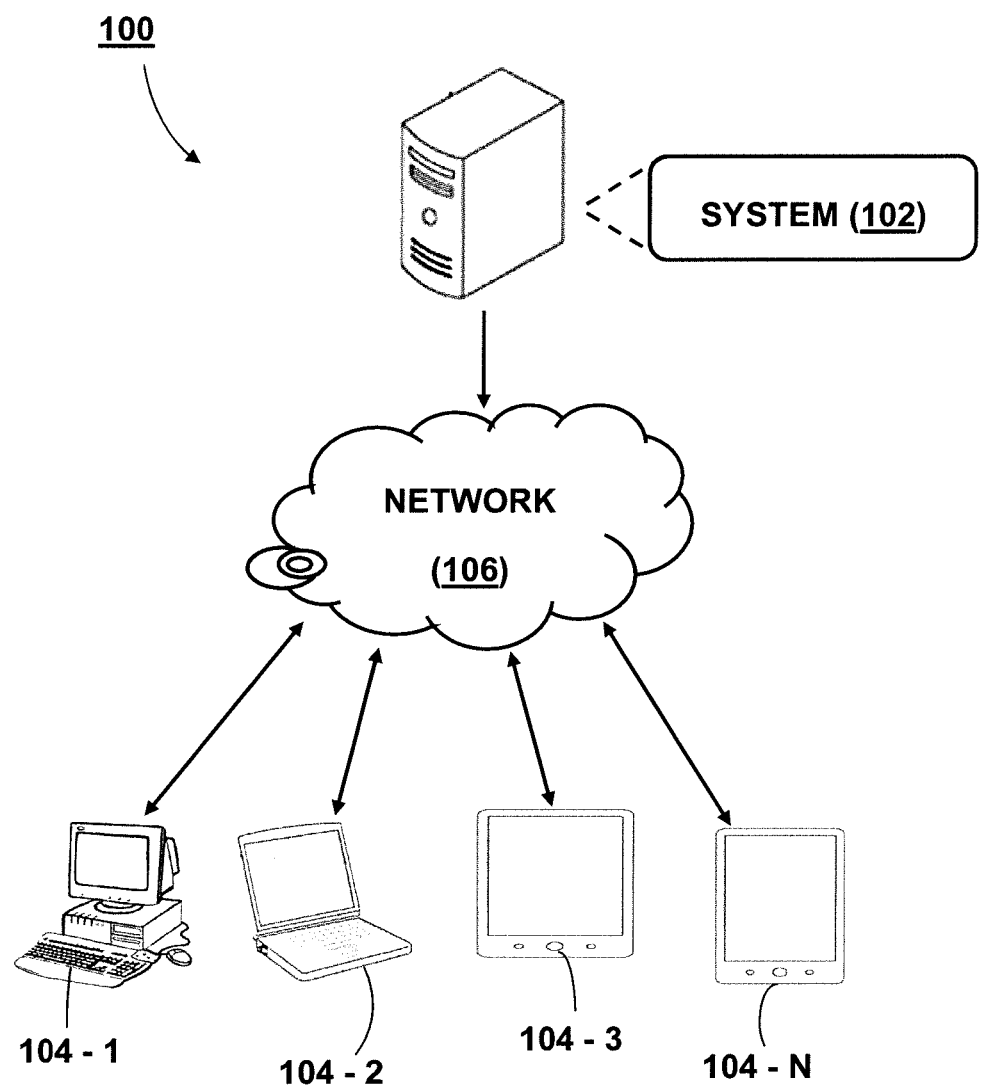
FIG. 1 illustrates a network implementation of a system for determining a total processing time (T) for executing a plurality of jobs (n), in accordance with an embodiment of the present disclosure.

Referring now to FIG. 1, a network implementation 100 of a system 102 for determining a total processing time (T) for executing a plurality of jobs (n) is illustrated, in accordance with an embodiment of the present disclosure. In one embodiment, the system 102 may be configured to receive the plurality of jobs (n), a mean processing time (μ), and a queue length (k). In one aspect, the mean processing time (μ) may be indicative of average time required for executing a job of the plurality of jobs (n). Further, the queue length (k) may be indicative of a maximum number of jobs capable of being executed by a single computing resource in a predefined time period. The system 102 may be configured to distribute preliminary jobs (p) of the plurality of jobs (n) for execution across a plurality of computing resources based upon the queue length (k). Further, the system 102 may be configured to determine a first processing time ($T_F$) required for the execution of the preliminary jobs (p). In one embodiment, the first processing time ($T_F$) is determined using a residual time function [H(t)] of the queue length (k). In one aspect, $H(t) = 1/\mu \int_0^t (1-F(t))dt$. Further, F(t) may be indicative of a cumulative distribution function of a set of random variables ($x_1, x_2 \ldots x_p$). The system 102 may be further configured to distribute remaining jobs (n−p) of the plurality of jobs (n) for execution across the plurality of computing resources based upon the queue length (k). The system 102 may be configured to determine a second processing time ($T_S$) required for the executing of the remaining jobs (n−p) based upon the first processing time ($T_F$) and the queue length (k). Further, the system 102 may be configured to sum the first processing time ($T_F$) and the second processing time ($T_S$) in order to determine the total processing time (T).

Although the present disclosure is explained considering that the system 102 is implemented as a server, it may be understood that the system 102 may also be implemented in a variety of computing systems, such as a laptop computer, a desktop computer, a notebook, a workstation, a mainframe computer, a network server, and the like. In one implementation, the system 102 may be implemented in a cloud-based environment. It will be understood that the system 102 may be accessed by multiple users through one or more user devices 104-1, 104-2, 104-3, and 104-N, collectively also referred to as a user device 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the Internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
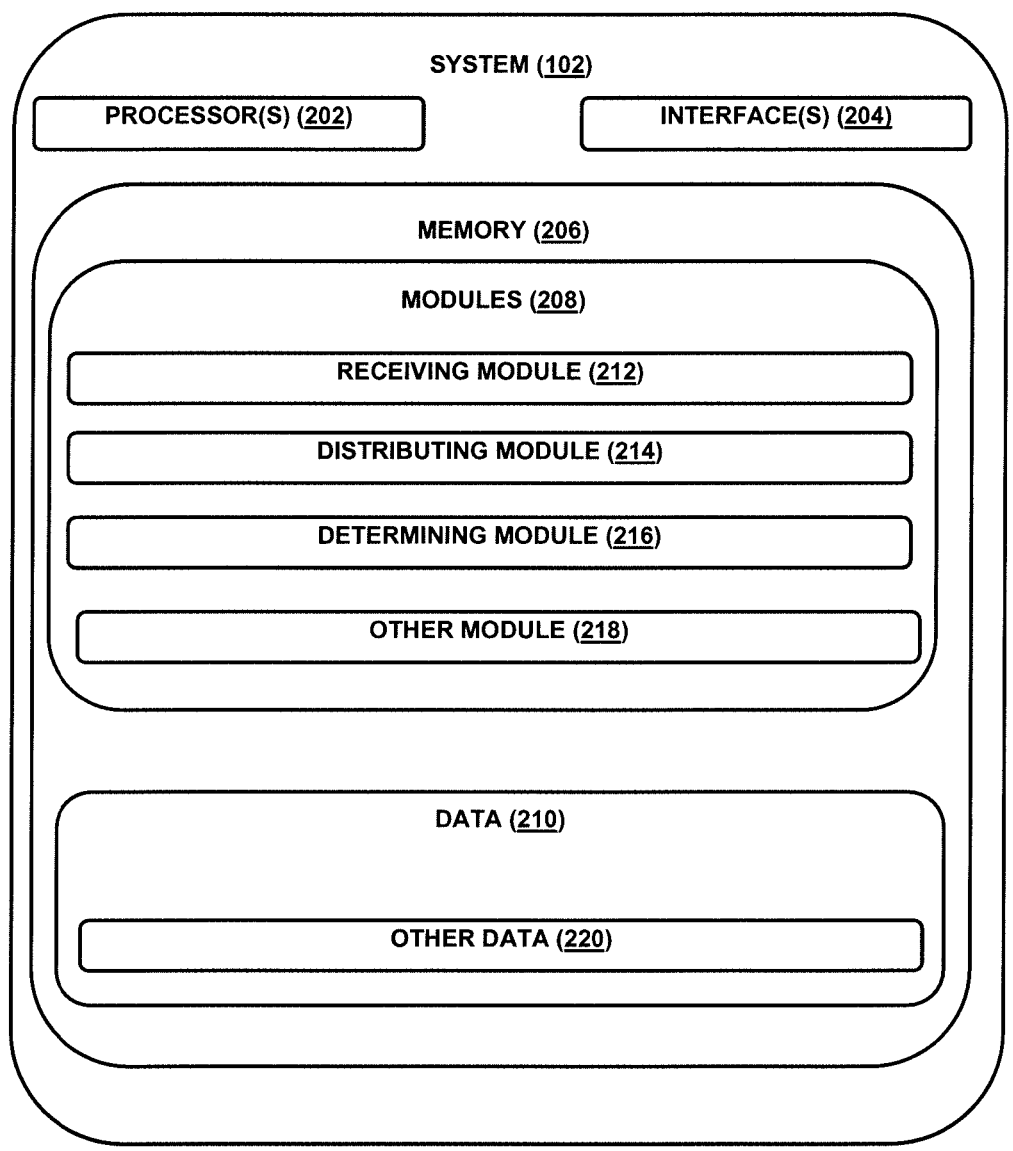
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user device 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include a receiving module 212, a distributing module 214, a determining module 216, and other module 218. The other module 218 may include programs or coded instructions that supplement applications and functions of the system 102.

The data 210, amongst other things, serves as a repository for storing data processed, received, and generated by one or more of the modules 208. The data 210 may also other data 220. The other data 220 may include data generated as a result of the execution of one or more modules in the other module 218.

In one implementation, at first, a user may use the user device 104 to access the system 102 via the I/O interface 204. The user may register themselves using the I/O interface 204 in order to use the system 102. The working of the system 102 using the plurality of modules 208 is explained in detail referring to FIGS. 2 and 3 as explained below. In order to understand the working of the disclosure, consider an outsourcing entity has outsourced execution of a plurality of jobs, to an outsourcee entity. The outsourcee may have to allocate desired number of computing resources such as servers, hardware and/or software components, and the like in order to execute the plurality of jobs, as per the requirements of the outsourcing entity. The plurality of jobs may be continuously arriving for the execution at the outsourcee entity location, and hence need to be executed appropriately, satisfying the requirements of the outsourcing entity. The present system 102 enables the outsourcee entity to determine sufficient number of the computing resources to execute the plurality of jobs, the details of which is further explained as below.

Receiving Module 212

In an embodiment, the receiving module 212, as shown in FIG. 2, may be configured to receive a plurality of requirements of the outsourcing entity. The plurality of requirements may be associated to the execution of the plurality of jobs. In one embodiment, the receiving module 212 may be configured to receive the plurality of jobs (n) that are required to be executed by one or more software applications belonging to the outsourcee entity. In one embodiment, the plurality of jobs (n) may be of similar or diverse skill types, and may be distributed across one or more geographical locations belonging to the outsourcee entity. In one example, the plurality of jobs (n) may be of the skill types comprising software development, software maintenance, Business Process Outsourcing (BPO), and the like. In one embodiment, the one or more software applications may require effective number of the computing resources in order to execute the plurality of jobs (n) as per the plurality of requirements. The plurality of requirements further comprises receiving by the receiving module 212, a mean processing time ($\mu$), and a queue length (k). In one embodiment, the mean processing time ($\mu$) may be indicative of average time required for executing a job of the plurality of jobs (n). Further, the queue length (k) may be indicative of a maximum number of jobs capable of being executed by a single computing resource in a predefined time period. In addition to the mean processing time ($\mu$) and the queue length (k), the receiving module 212 may be configured to receive a plurality of parameters comprising a reference processing time ($T_R$), a standard deviation ($\sigma$), a tolerance level ($\alpha$) agreed upon in a service level agreement (SLA), and a confidence level ($1-\alpha$). In one embodiment, the reference processing time ($T_R$), the mean processing time ($\mu$), and the plurality of parameters are predefined in the service level agreement (SLA).

In an embodiment, the mean processing time ($\mu$) may indicate average time required for executing each job. In one example, assume the number of jobs (n) is ten, out of which four jobs require 50 minutes for the execution. Similarly, assume that the remaining jobs (i.e. six out of 10) require 60 minutes for the execution, then the mean processing time ($\mu$) required for the execution of all ten jobs will be 44 minutes. Similarly, based on the skill type of the number of jobs (n) and their continuous arrival in batches, the mean processing time ($\mu$) indicating the execution of each job corresponding to a batch of jobs may be received. Based on the requirements of the outsourcing entity, there may be a feasibility to allow a variance in the mean processing time ($\mu$). The standard deviation ($\sigma$) indicates such variance in the mean processing time ($\mu$). More particularly, the standard deviation ($\sigma$) indicates a variance in the mean processing time ($\mu$). In one example, assume that the mean processing time ($\mu$) is 50 minutes, and the standard deviation ($\sigma$) is also 50 minutes, then the variance allowable in the mean processing time ($\mu$) will be square of the standard deviation ($\sigma$), i.e. $\sigma^2$, which will be 2500, in the aforementioned scenario.

In one embodiment, along with the mean processing time ($\mu$), and the standard deviation ($\sigma$), the outsourcee entity may also have to execute the plurality of jobs (n) based on the tolerance level ($\alpha$). The tolerance level ($\alpha$) may be indicative of a maximum time allowable in addition to the reference processing time ($T_R$) for executing the plurality of jobs (n). In one embodiment, the reference processing time ($T_R$) may indicate a processing time agreed upon in the SLA for executing the plurality of jobs (n). In one implementation, reference processing time ($T_R$) may indicate the total time limit prescribed by the outsourcing entity to the outsourcee entity in order to complete the execution of the plurality of jobs (n). As per the service level agreement (SLA), the outsourcee entity may be allowed to execute the plurality of jobs (n) with the maximum time allowable in addition to the reference processing time ($T_R$). In one example, assuming the reference processing time ($T_R$) as 100 minutes, and the tolerance level as 5%, then the outsourcee entity may be allowed to execute the plurality of jobs (n) in 105 minutes with the maximum allowable time of 5 minutes. It is to be understood that, though the outsourcee entity may be allowed to execute the plurality of jobs (n) as per the tolerance level ($\alpha$) predefined in the SLA, the outsourcee entity may, depending on the number of computing resources and their configuration, execute the plurality of jobs (n) even before the expiry of the reference processing time ($T_R$). For example, considering the present scenario of the reference processing time ($T_R$) as 100 minutes and the tolerance level ($\alpha$) as 5%, the outsourcee entity may complete the execution of the plurality of jobs (n) in less than 100 minutes, for example, 90 minutes, 85 minutes, and the like. However, the outsourcee entity may not be allowed to complete the execution of plurality of jobs (n) by taking a reference processing time ($T_R$) of greater than 105 minutes.

In one embodiment, the confidence level (1−$\alpha$) depends on the tolerance level ($\alpha$). In one embodiment, the confidence level (1−$\alpha$) indicates maximum percentage of the plurality of jobs that is required to be executed in the reference processing time ($T_R$), and as per the service level agreement (SLA). Hence, the outsourcee entity may have to accordingly provide the sufficient and effective number of the computing resources in order to execute the plurality of jobs (n) in the reference processing time ($T_R$) and in accordance with the service level agreement (SLA). In one implementation, the reference processing time ($T_R$), the mean processing time ($\mu$), and the plurality of parameters may be processed in order to compute the queue length (k). The queue length (k) is indicative of 'k' jobs out of the plurality of jobs (n) to be executed by a single computing resource. The computation of the queue length (k) is further explained in detail as below.

In order to compute the queue length (k), consider the plurality of jobs (n) is distributed in a normalized function $F(x)$. In one implementation, the queue length (k) may be computed using the normal distribution function as follows:

$$N((T_R - k\mu)/\sqrt{k\sigma^2}) \geq 1 - \alpha \quad (I)$$

Applying normal inverse function on both sides of equation (I);

$$(T_R - k\mu)/\sqrt{k\sigma^2} \geq \text{Normalinv}(1-\alpha; \mu; \sigma^2) \quad (II)$$

In one embodiment, assuming the mean processing time ($\mu$), and the standard deviation ($\sigma$) are received in normalized state, values corresponding to the mean processing time ($\mu$), and the standard deviation ($\sigma$) may be 0 and 1 respectively. Specifically, the mean processing time ($\mu$), and the standard deviation ($\sigma$) may be having a numeric value of 0, and 1 respectively. Therefore, value of the variance in the normalized state may also be 1. Now, substituting the values of the mean processing time ($\mu$), and the standard deviation ($\sigma$) in the normalized state, equation II may be modified as follows:

$$(T_R - k\mu)/\sqrt{k\sigma^2} \geq \text{Normalinv}(1-\alpha; 0; 1) \quad (III)$$

$$(T_R - k\mu)/\sqrt{k\sigma^2} \geq \gamma \quad (IV)$$

Wherein, '$\gamma$'=Normalinv (1−$\alpha$; 0; 1), and wherein '$\gamma$' is an inverse parameter and 'k' indicates the queue length or 'k' jobs per queue or 'k' jobs being executed by the single resource. Further, '$T_R$' indicates the reference processing time.

In one embodiment, the values of the mean processing time ($\mu$) and the variance $\sigma^2$ is received in order to compute the queue length (k) of maximum value. In this scenario, the value of the inverse parameter $\gamma$ (Normalinv (1−$\alpha$; 0; 1) may be obtained from a normal inverse table 1 as shown below. The table below provides the value of the inverse parameter $\gamma$ based on the standard normal distribution, i.e. assuming the values of the mean processing time ($\mu$) and the variance ($\sigma^2$) as 0 and 1 respectively.

TABLE 1

Normal distribution - Inverse cumulative distribution function

| Value of (1 − $\alpha$) | Value of Inverse Parameter ($\gamma$) (assuming mean processing time ($\mu$) = 0; and variance ($\sigma^2$) = 1) |
|---|---|
| 0.50 | 0.0000 |
| 0.51 | 0.0251 |
| 0.52 | 0.0502 |
| 0.53 | 0.0753 |
| 0.54 | 0.1004 |
| . | |
| . | |
| . | |
| 0.95 | 1.6449 |
| 0.96 | 1.7507 |
| 0.97 | 1.8808 |
| 0.98 | 2.0537 |
| 0.99 | 2.3263 |

In one example, from the above table, it may be observed that, if the value of the confidence level (1−$\alpha$) is 0.95 (assuming the tolerance level ($\alpha$) as 5%), then the value of the inverse parameter $\gamma$ will be 1.6449. Similarly, based on the tolerance level ($\alpha$), the value of the inverse parameter $\gamma$ may be determined using the above table 1. It is to be noted that the above table 1 depicting the normal distribution using the Inverse cumulative distribution function is known in the art. It must be noted to one skilled in the art that values of (1−$\alpha$) and Inverse Parameter ($\gamma$) listed in the table 1 have been considered in order to explain an exemplary embodiment of the present disclosure and hence should not be limited to these values. Therefore, the value of inverse parameter $\gamma$ may be determined corresponding to any value of (1−$\alpha$) by referring to normal inverse tables available in the art. It must be understood that, in order to obtain the maximum value of the queue length (k), the above table 1 may be used for determining the inverse parameter $\gamma$ only when the distribution is standard normal distribution. Alternatively, when the distribution is normal, expected values of the mean processing time ($\mu$), and the standard deviation ($\sigma$) may be utilized for the determination of the inverse parameter $\gamma$. In one example, assuming the expected values of the mean processing time ($\mu$), the standard deviation ($\sigma$) and the tolerance level ($\alpha$) are 50 minutes, 50 minutes and 5% respectively, the inverse parameter may be determined as follows:

$$\text{Inverse parameter } \gamma = ((\text{Normalinv}(1-\alpha;0;1))^*\text{expected value of variance}(\sigma^2)) + \text{expected value of mean processing time}(\mu) \quad (V)$$

Now, substituting the expected values in equation V, $$\text{Inverse parameter } \gamma = (1.6449^*2500) + 50$$

Thus, the value of the Inverse parameter $\gamma$ in the above example will be 4162.

In one embodiment, after the determination of the inverse parameter γ, the queue length (k) may be computed based on the reference processing time ($T_R$), the mean processing time (μ), the standard deviation (σ), and the inverse parameter (γ) using the equation IV as follows:
According to the equation IV, $$(T_R - k\mu)/\sqrt{k\sigma^2} \geq \gamma,$$

Therefore, $(T_R - k\mu) - \gamma/\sqrt{k\sigma^2} \geq 0$      (VI),

From the above equation VI, the queue length (k) may be computed using quadratic equation $k\mu + \gamma\sigma\sqrt{k} \leq T_R$, wherein, $$\sqrt{k} = (-\gamma\sigma \pm \sqrt{\gamma^2\sigma^2 + 4\mu T_R})/2\mu \quad\quad (VII)$$

Therefore, the queue length (k) may be computed using equation VII, as mentioned above. The queue length indicates executing of 'k' jobs per queue, or the maximum number of jobs (k) capable of being executed by the single computing resource.

In one embodiment, when the distribution of the plurality of jobs is exponential, and not the standard normal distribution as described above, the system 102 may be configured to compute the queue length (k) using Gamma Inverse Function. In one example, assuming F(x) indicates the exponential distribution of the plurality of jobs (n), then applying the Gamma Inverse Function on F, the queue length (k) may be computed using following relation:

$$F(T_R; k; 1/\mu) = 1 - \Sigma(1/n!)e^{-T_R/\mu}(T_R/\mu)^n \geq 1 - \alpha, \text{ wherein}$$
$n = 0$ to $k-1$      (VII-A)

Therefore, the queue length (k) may also be computed using equation VII-A, when the distribution of the jobs is exponential. The queue length indicates executing of 'k' jobs per queue, or the maximum number of jobs (k) capable of being executed by the single computing resource.

Based upon the computation of the queue length (k), the number of computing resources required for the execution of the plurality of jobs (n) may be determined. In one embodiment, the number of computing resources may be determined based on processing of the queue length (k) and the number of jobs (n). In one implementation, the number of computing resources is determined based on a ceiling function of division of the plurality of jobs (n) and the queue length (k). Specifically, the number of computing resources (such as the servers, and the like) may be determined as follows, $$m = \lceil (n/k) \rceil \quad\quad (VIII)$$

wherein, 'm' indicates the number of computing resources, and $\lceil (n/k) \rceil$ indicates the ceiling function of (n/k), and Wherein n indicates the number of jobs, and k indicates the queue length.

It must be understood that, the ceiling function maps a real number to the smallest following integer. Specifically, ceiling $(x) = \lceil x \rceil$ is the smallest integer not less than x. In one example, if $x = 12/5 = 2.4$, then the ceiling $(x) = \lceil 2.4 \rceil$ which will be equal to 3. Thus, according to the present disclosure, the number of computing resources (m) is determined based on the ceiling function of the division of the plurality of jobs (n) and the queue length, i.e. the ceiling function of (n/k).

After the number of computing resources is determined, the I/O interface 204 may be adapted to display the queue length (k) and the number of computing resources (m) determined on the user device 104. The I/O interface 204 may also export the queue length (k) and the number of the computing resources to an external display device associated to the outsourcing entity. Further, the system 102, based on the determination of the computing resources, may be configured to allocate the executing of the plurality of jobs (n) to the computing resources, such that each computing resource is capable of executing k jobs out of the n jobs in the total processing time (T), and hence the plurality of jobs (n) may be executed in the total processing time (T).

In an exemplary embodiment, assume that the number of jobs to be executed by the software application of the outsourcing entity is 75. Further, assume that each job requires the mean processing time (μ) of 50 minutes and the standard deviation (σ) of 50 minutes. Therefore, the variance ($\sigma^2$) will be 2500 minutes. Consider the reference processing time ($T_R$) required for executing 75 jobs is 240 minutes, and the tolerance level (α) is 5%. Therefore, the confidence level (1−α) will be 0.95. Consider the distribution as the standard normal distribution. Therefore, from the table 1, the value of the inverse parameter γ will be approximately 1.64. Now, in this exemplary embodiment, the queue length (k) may be computed using the equation VII as follows:
As per the equation VII, $\sqrt{k} = (-\gamma\sigma \pm \sqrt{\gamma^2\sigma^2 + 4\mu T_R})/2\mu$, Therefore, $\sqrt{k} = (-\gamma\sigma + \sqrt{\gamma^2\sigma^2 + 4\mu T_R})/2\mu$     (A) OR $\sqrt{k} = (-\gamma\sigma - \sqrt{\gamma^2\sigma^2 + 4\mu T_R})/2\mu$     (B)

Substituting the values in equation (A), $\sqrt{k} = \{-1.64*50 + \sqrt{(1.64*1.64*2500 + 4 \times 240 \times 50)}\}/100$ Therefore, $\sqrt{k} = 1.52$     (C)

Alternatively, substituting the values in equation (B), $\sqrt{k} = \{-1.64*50 - \sqrt{(1.64*1.64*2500 + 4 \times 240 \times 50)}\}/100$ Therefore, $\sqrt{k} = -3.16$     (D)

Thus, k can be computed from (C) and (D) as $(1.52)^2 = 2.31$ and $(-3.16)^2 = 9.98$ respectively. Assuming k=2.31 is possible, hence k=3 jobs may be executed in 240 minutes at the single computing resource (e.g. a single server). Further, each job may take 50 minutes on an average processing time. It must be noted that at least two jobs may be executed by the single server, based on above computation, wherein k=2.31. Further, the number of computing resources required for the executing of 75 jobs will be $_{539}$ 75/3$_1$=25 resources or 25 servers. Thus, in order to execute all the 75 jobs in the reference processing time of 240 minutes, 25 servers may be required. Thus, the queue length (k) enables determining the number of computing resources required for execution of the plurality of jobs (n). The queue length (k) thus computed, and the number of computed resources enables in distributing the execution of the plurality of jobs (n) and further determining the total processing time (T) which is explained in detail as below.

Distributing Module 214

After the receipt of the number of jobs (n) along with the queue length (k), the mean processing time (μ), and the plurality of parameters via the receiving module 212, the distributing module 214 may be configured to distribute preliminary jobs (p) of the plurality of jobs (n) for execution across the plurality of computing resources. In one implementation, the distributing module 214 may distribute the preliminary jobs (p) for the execution across the plurality of computing resources based upon the queue length (k). The queue length (k) indicates maximum number of jobs capable of being executed by a single computing resource of the plurality of computing resources in a predefined time period. Accordingly, depending on the number of the preliminary jobs (p) and the value of the queue length (k), the distributing module 214 may be configured to distribute the preliminary jobs (p)

across the plurality of computing resources. In one example, assume that the queue length (k) is three and the number of preliminary jobs (p) to be executed is 45. Then, the number of computing resources required for executing 45 jobs would be 45/3=15. Therefore, the number of preliminary jobs (45) would be distributed across the number of computing resources (15), such that each computing resource of the number of computing resources (15) is capable of handling three preliminary jobs in a predefined time period and capable of executing all the jobs (n) in the reference processing time ($T_R$).

In one embodiment, the distribution of the preliminary jobs (p) is further based upon a density function $Fx_p (T_F)$. The density function $Fx_p (T_F)$ indicates probability distribution of the preliminary jobs (p) across the number of computing resources. In the density function $Fx_p (T_F)$, '$x_p$' may indicate a first set of random variables ($x_1, x_2 \ldots x_p$) which are associated with the preliminary jobs (p). Further, '$T_F$' may indicate a first processing time ($T_F$) required for the execution of the preliminary jobs (p) by the number of computing resources. In one embodiment, the distributing module 214 may be configured to determine the first processing time ($T_F$) using a residual time function [H(t)] of the queue length (k). Specifically, the first processing time ($T_F$) is determined using a formula, $$T_F = H\{(t)\}^{P_1} \quad (IX),$$

Wherein, $H(t) = 1/\mu \int_0^t (1-F(t))dt$ (X)

$P_1$=Number of computing resources required for executing the preliminary jobs (p), 't' indicates the reference processing time $T_R$ set as per the SLA, and F (t) in the equation (X) indicates a cumulative distribution function of the set of random variables ($x_1, x_2 \ldots x_p$) in terms of time 't'.

It must be understood that the preliminary jobs (p) are distributed across the computing resources available based upon the queue length (k), such that the number of jobs (n) has to be processed in the reference time ($T_R$). Therefore, the reference processing time ($T_R$) is distributed, for processing, across the number of preliminary jobs (p) using the residual time function [H(t)] of the queue length (k), such that the number of jobs (n) are processed in the reference time ($T_R$) as per the SLA. Therefore, it must be understood that the determination of the first processing time ($T_F$) is based upon the distribution of the reference processing time ($T_R$), and the number of computing resources ($P_1$) required for processing the preliminary jobs (p) which is based on the queue length (k).

Subsequent to the determination of the first processing time ($T_F$), the distributing module 214 may be configured to distribute remaining jobs (n-p) for execution across the plurality of computing resources. In one embodiment, the distribution of the remaining jobs (n-p) for the execution is based upon the queue length (k). Further, the distribution of the remaining jobs (n-p) for the execution is based upon a density function $Fx_{n-p} (T_S)$. The density function $Fx_{n-p} (T_S)$ indicates probability distribution of the remaining jobs (n-p) across the number of computing resources. In the density function $Fx_{n-p}$ (Ts), '$x_{n-p}$' may indicate a second set of random variables ($y_1, y_2 \ldots y_{n-p}$) which are associated with the remaining jobs (n-p). Further, '$T_S$' may indicate a second processing time required for the execution of the remaining jobs (n-p) by the number of computing resources. In one implementation, the determining module 216 may be configured to compute a second processing time ($T_S$) and accordingly determine the total processing time (T) which is described in detail in subsequent paragraphs as below.

Determining Module 216

In one embodiment, the determining module 216 may be configured to compute the second processing time ($T_S$) based upon the first processing time ($T_F$) and the queue length (k). Specifically, the determining module 216 may compute the second processing time ($T_S$) based upon the number of computing resources required for processing the preliminary jobs (p) in the first processing time ($T_F$) as per the queue length (k). Subsequent to the determination of the second processing time ($T_S$), the determining module 216 may be configured to determine the total processing time (T) required for the execution of the plurality of jobs (n). The determining module 216 may determine the total processing time by summing the first processing time ($T_F$) and the second processing time (Ts). In alternative embodiment, the total processing time (T) may be determined based on an integral function of $Fx_{n-p}$ ($T_{S-y}$) and $Fx_p$ (y), wherein (y) indicates the number of remaining jobs. The determination of the total processing time (T) is further explained with an example as below.

Example:

Let us take μ (mean–processing time)=50 min
S.D=σ=50 min and variance=$\sigma^2$=2500
$T_R$=Reference processing time=240 min
α=probability not meeting SLA=5%=0.05
1−α=0.95
γ=Normalinv(1−α;mean;variance)=Normalinv(0.95,0,1)
=1.64

Now, as per equation I, $$N((T_R - k\mu)/\sqrt{k^* \text{variance}}) \geq 1 - \alpha$$

$$T_R - k\mu / \sqrt{k^* \text{variance}} \geq Normalinv(0.95; 0; 1)$$

$$\sqrt{k} = -\sigma\gamma \pm \sqrt{(\sigma 2 \gamma 2 + 4T\mu)/2\mu}$$
$$= \{-50 * 1.64 \pm \sqrt{(2500^* 1.64^* 1.64 + 4 \times 240 \times 50)}\}/100$$
$$= -3.16 \text{ or } 1.52$$

$$k = 9.98 \text{ or } 2.31$$

k=2.31 is possible. Hence k=3 jobs can be done in 240 min at one server and each job takes 50 minutes on an average processing time. (Minimally k=2 jobs can be done).

Therefore, it must be understood that, if we have 75 jobs, then as per the queue length, in order to execute 75 jobs, 25 (=75/3) servers may be required. In this example, assume the total number of jobs (n) to be executed is 120, out of which 75 jobs are preliminary jobs (p) and 45 jobs are remaining jobs waiting in a pool. Then, as per the random distribution of the preliminary jobs (p) across the total reference processing time ($T_R$) and the queue length (k), the number of preliminary jobs (p) (75 jobs) will be executed in the first processing time ($T_F$)=240 minutes. Therefore, remaining jobs (balance jobs=45) will be executed in a second processing time ($T_S$) of 160 minutes. This is because as per the queue length (k), 25 servers will process 25 jobs of the 75 jobs in 80 minutes, such that 75 jobs are processed in 240 minutes. Therefore, to process 45 jobs it will take (TS=80×2=160 minutes). Therefore, the total processing time (T) required for processing 120 jobs will be $T_F + T_S$=240+160=400 minutes.

Exemplary embodiments discussed above may provide certain advantages. Though not required to practice aspects of the disclosure, these advantages may include those provided by the following features.

Some embodiments of the present disclosure enable the computation of the queue length (k) indicating maximum number of jobs capable of being executed by a single server.

Some embodiments of the present disclosure enable the determination of the number of servers required for the executing of the number of jobs (n) arriving in real time.

Some embodiments of the present disclosure enable real time allocation of the number of servers for the execution of the number of jobs based on the queue length (k) and the number of jobs (n).

Some embodiments of the present disclosure enables computing processing time required for executing preliminary jobs (p) of the number of jobs (n).

Some embodiments of the present disclosure enables computing processing time required for executing remaining jobs (n–p) of the number of jobs (n).

Some embodiments of the present disclosure enables determining total processing time required for the total number of jobs (n) comprising the preliminary jobs (p) and the remaining jobs (n–p).

Figure 3:
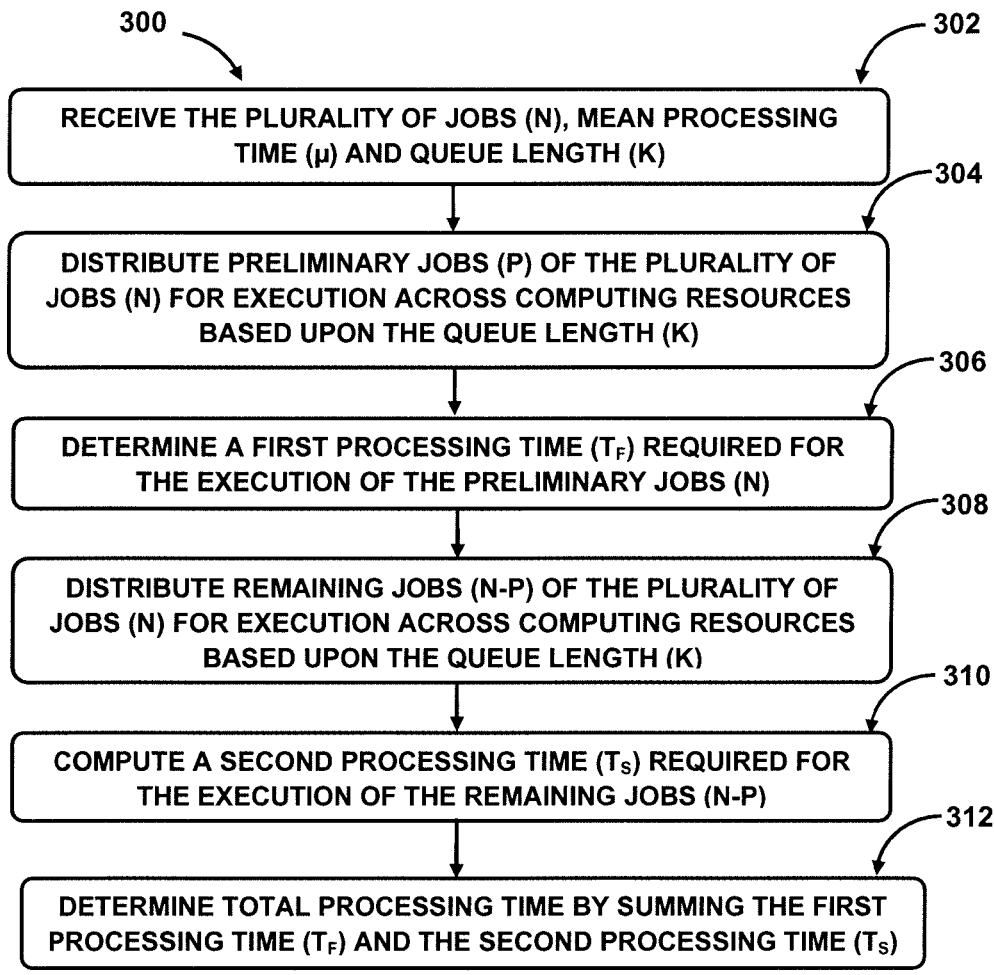
FIG. 3 illustrates a method for determining a total processing time (T) for executing a plurality of jobs (n), in accordance with an embodiment of the present disclosure.

Referring now to FIG. 3, a method 300 for determining total processing time required for executing a plurality of jobs is shown, in accordance with an embodiment of the present disclosure. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the disclosure described herein. Furthermore, the method can be implemented in any suitable hardware, software, firmware, or combination thereof. However, for ease of explanation, in the embodiments described below, the method 300 may be considered to be implemented in the above described system 102.

At block 302, the plurality of jobs (n), the mean processing time ($\mu$), and the queue length (k) may be received. In one implementation, the plurality of jobs (n), the mean processing time ($\mu$), and the queue length (k) may be received by the receiving module 212. The plurality of jobs (n) may be received from the outsourcing entity. The mean processing time ($\mu$) indicates average time required for executing a job. The queue length (k) indicates a maximum number of jobs capable of being executed by a single computing resource in a predefined time period. In one implementation, the plurality of jobs (n), the mean processing time ($\mu$), and the queue length (k) may be stored in the data 210.

At block 304, preliminary jobs (p) of the plurality of jobs (n) may be distributed for execution across a plurality of computing resources based upon the queue length (k). In one implementation, the preliminary jobs (p) may be distributed by the distributing module 214.

At block 306, a first processing time ($T_F$) required for the execution of the preliminary jobs (p) may be determined. In one embodiment, the first processing time ($T_F$) is determined using a residual time function [H(t)] of the queue length (k), wherein $H(t)=1/\mu\int_0^t(1-F(t))dt$, and wherein F(t) is indicative of a cumulative distribution function of a set of random variables ($x_1, x_2 \ldots x_p$). In one implementation, the first processing time ($T_F$) may be determined by the distributing module 214.

At block 308, remaining jobs (n–p) of the plurality of jobs (n–p) may be distributed for execution across a plurality of computing resources based upon the queue length (k). In one implementation, the remaining jobs (n–p) may be distributed by the distributing module 214.

At block 310, a second processing time ($T_S$) required for the execution of the remaining jobs (n–p) may be computed. The second processing time ($T_S$) may be computed based upon the first processing time ($T_F$) and the queue length (k). In one implementation, the second processing time ($T_S$) may be computed by the determining module 216.

At block 312, a total processing time (T) required for the execution of the plurality of jobs (n) comprising the preliminary jobs (p) and the remaining jobs (n–p) may be determined. In one embodiment, the total processing time (T) may be determined by summing the first processing time ($T_F$) and the second processing time ($T_S$). In one implementation, the total processing time (T) may be determined by the determining module 216.

Although implementations for methods and systems for determining total processing time required for executing a plurality of jobs have been described in language specific to structural features and/or methods, it is to be understood that the appended claims are not necessarily limited to the specific features or methods described. Rather, the specific features and methods are disclosed as examples of implementations for determining total processing time required for executing a plurality of jobs.

We claim:

1. A method for determining a total processing time (T) required for executing a plurality of jobs (n) on a plurality of computing resources, the method comprising:

receiving the plurality of jobs (n), a mean processing time ($\mu$), and a queue length (k), wherein the mean processing time ($\mu$) is indicative of average time required for executing each job of the plurality of jobs (n), and wherein the queue length (k) indicates a maximum number of jobs capable of being executed by a single computing resource in a predefined time period;

distributing preliminary jobs (p) of the plurality of jobs (n) for execution across the plurality of computing resources based upon the queue length (k);

determining a first processing time ($T_F$) required for the execution of the preliminary jobs (p), wherein the first processing time ($T_F$) is determined using a residual time function [H(t)] the queue length (k), wherein $H(t)=1/\mu\int_0^t(1-F(t)dt$, and wherein F(t) is indicative of a cumulative distribution function of a set of random variables ($x_1, x_2 \ldots x_p$);

distributing remaining jobs (n–p) of the plurality of jobs (n) for execution across the plurality of computing resources based upon the queue length (k);

computing a second processing time ($T_s$) required for the executing of the remaining jobs (n–p), wherein the second processing time ($T_s$) is computed based upon the first processing time ($T_F$) and the queue length (k); and summing the first processing time ($T_F$) and the second processing time (Ts) in order to determine the total processing time (T), wherein the receiving, the distributing the preliminary jobs (p), the determining, the distributing the remaining jobs (n−p), the computing, and the summing are performed by a processor using a set of instructions stored in a memory.

2. The method of claim 1, further comprising receiving a plurality of parameters comprising a reference processing time (TR), a standard deviation ($\sigma$), a tolerance level ($\alpha$) agreed upon in a service level agreement (SLA), and a confidence level (1−$\alpha$), wherein the reference processing time (TR) indicates a processing time agreed upon in the SLA for executing the plurality of jobs (n), and wherein the standard deviation ($\sigma$) indicates a variance in the mean processing time ($\mu$), and wherein the tolerance level ($\alpha$) is indicative of a maximum time allowable in addition to the reference processing time (TR) for executing the plurality of jobs (n).

3. The method of claim 2, wherein the queue length (k) is based upon the plurality of parameters predefined in the SLA.

4. The method of claim 1, wherein the distribution of the preliminary jobs (p) is further based upon a density function $Fx_p(T_F)$, wherein ($x_p$) is indicative of the set of random variables ($x_1, x_2 \ldots x_p$), and wherein the density function $Fx_p(T_F)$ indicates probability distribution of the preliminary jobs (p) across the number of computing resources.

5. The method of claim 1, wherein the first processing time ($T_F$) is obtained using a formula, $T_F = \{H(t)\}_1^{P_1}$, wherein $P_1$ indicates the number of computing resources required for processing the preliminary jobs (p).

6. The method of claim 1, wherein the distribution of the remaining jobs (n−p) is further based upon a density function $Fx_{n-p}(T_s)$, wherein ($x_{n-p}$) is a second set of random variables ($y_1, y_2 \ldots yn-p$), and wherein the density function $Fx_{n-p}(T_s)$ indicates probability distribution of the remaining jobs (n−p) across the number of computing resources.

7. The method of claim 1, wherein the total processing time (T) is an integral function of $Fx_{n-p}(T_s-y)$ and $Fx_p(y)$, wherein (y) indicates the number of the remaining jobs.

8. A system for determining a total processing time (T) required for executing a plurality of jobs (n) on a plurality of computing resources, the method comprising:
 a processor; and
 a memory coupled to the processor, wherein the processor is capable of executing a plurality of modules stored in the memory, and wherein the plurality of modules comprises:
  a receiving module configured to receive the plurality of jobs (n), a mean processing time ($\mu$), and a queue length (k), wherein the mean processing time ($\mu$) is indicative of average time required for executing each job of the plurality of jobs (n), and wherein the queue length (k) indicates a maximum number of jobs capable of being executed by a single computing resource in a predefined time period;
  a distributing module configured to,
   distribute preliminary jobs (p) of the plurality of jobs (n) for execution across the plurality of computing resources based upon the queue length (k),
   determine a first processing time ($T_F$) required for the execution of the preliminary jobs (p), wherein the first processing time ($T_F$) is determined using a residual time function [H(t)] of the queue length (k), wherein H(t)=1/$\mu\int_0^t$(1−F(t)dt, and wherein F(t) is indicative of a cumulative distribution function of a set of random variables (x1, x2 . . . . xp), and
   distribute remaining jobs (n−p) of the plurality of jobs (n) for execution across the plurality of computing resources based upon the queue length (k); and
  a determining module configured to,
   compute a second processing time ($T_s$) required for the executing of the remaining jobs (n−p), wherein the second processing time ($T_s$) is computed based upon the first processing time ($T_F$) and the queue length (k), and
   sum the first processing time ($T_F$) and the second processing time ($T_s$) in order to determine the total processing time (T).

9. The system of claim 8, wherein the receiving module is further configured to receive a plurality of parameters comprising a reference processing time ($T_R$), a standard deviation ($\sigma$), a tolerance level ($\alpha$) agreed upon in a service level agreement (SLA), and a confidence level (1−$\alpha$), wherein the reference processing time ($T_R$) indicates a processing time agreed upon in the SLA for executing the plurality of jobs (n), and wherein the standard deviation ($\sigma$) indicates a variance in the mean processing time ($\mu$), and wherein the tolerance level ($\alpha$) is indicative of a maximum time allowable in addition to the reference processing time ($T_R$) for executing the plurality of jobs (n).

10. A computer program product embodied in a non-transitory computer readable medium having a computer program for determining a total processing time (T) required for executing a plurality of jobs (n) on a plurality of computing resources, the computer program product comprising a set of instructions, the set of instructions comprising instructions for:
 receiving the plurality of jobs (n), a mean processing time ($\mu$), and a queue length (k), wherein the mean processing time ($\mu$) is indicative of average time required for executing each job of the plurality of jobs (n), and wherein the queue length (k) indicates a maximum number of jobs capable of being executed by a single computing resource in a predefined time period;
 distributing preliminary jobs (p) of the plurality of jobs (n) for execution across the plurality of computing resources based upon the queue length (k);
 determining a first processing time ($T_F$) required for the execution of the preliminary jobs (p), wherein the first processing time ($T_F$) is determined using a residual time function [H(t)] of the queue length (k), wherein H(t)=1/$\mu\int_0^t$(1−F(t))dt, and wherein F(t) is indicative of a cumulative distribution function of a set of random variables (x1, x2 . . . . xp);
 distributing remaining jobs (n−p) of the plurality of jobs (n) for execution across the plurality of computing resources based upon the queue length (k); and
 computing a second processing time ($T_s$) required for the executing of the remaining jobs (n−p), wherein the second processing time ($T_s$) is computed based upon the first processing time ($T_F$) and the queue length (k); and
 summing the first processing time ($T_F$) and the second processing time (Ts) in order to determine the total processing time (T), wherein the receiving, the distributing the preliminary jobs (p).

\* \* \* \* \*